(No Model.) 2 Sheets—Sheet 1.

M. C. NIXON.
BALING PRESS.

No. 575,660. Patented Jan. 19, 1897.

Witnesses:
R. McColl
John MacAloney

Inventor:
Moses C. Nixon (No Model.)  
2 Sheets—Sheet 2.

M. C. NIXON.
BALING PRESS.

No. 575,660. Patented Jan. 19, 1897.

Witnesses.

Inventor.
Moses C. Nixon

UNITED STATES PATENT OFFICE.

MOSES C. NIXON, OF OMAHA, NEBRASKA.

BALING-PRESS.

SPECIFICATION forming part of Letters Patent No. 575,660, dated January 19, 1897.

Application filed May 31, 1894. Serial No. 513,022. (No model.)

*To all whom it may concern:*

Be it known that I, MOSES C. NIXON, residing at Omaha, in the county of Douglas and State of Nebraska, have invented certain useful Improvements in Baling-Presses; and I do hereby declare that the following is a full, clear, and exact description of the invention, such as will enable others skilled in the art to which it appertains to make and use the same, reference being had to the accompanying drawings, which form a part of this specification.

This invention relates to a new and novel improvement in baling-presses.

Figure 1:
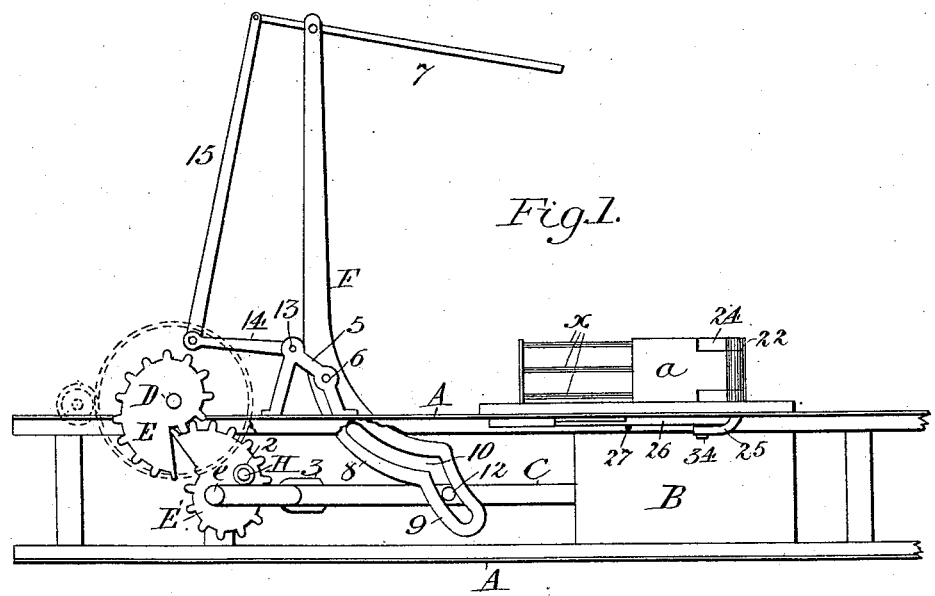
Figure 2:
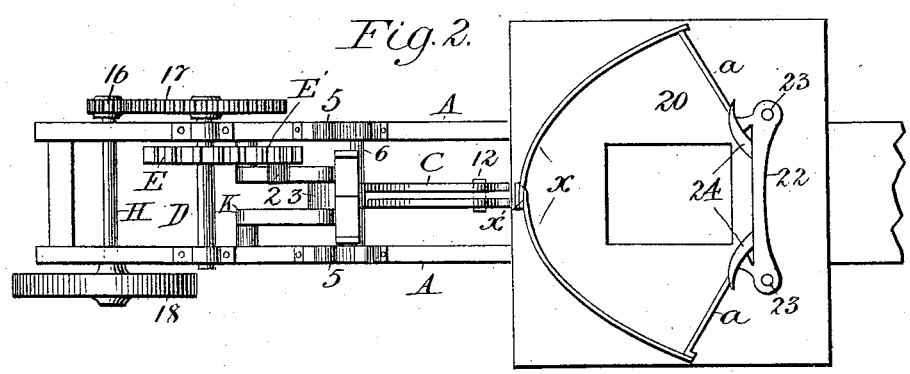
Figure 3:
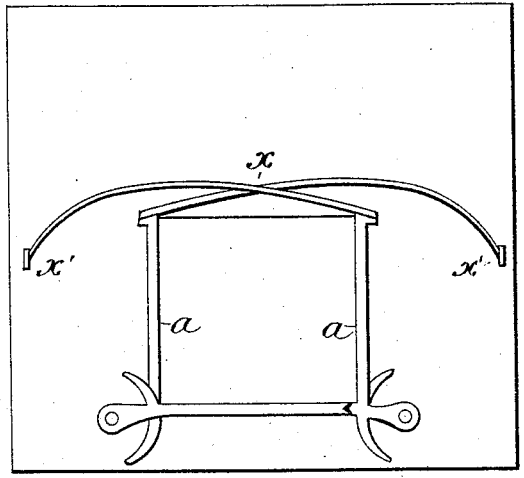
Figure 4:
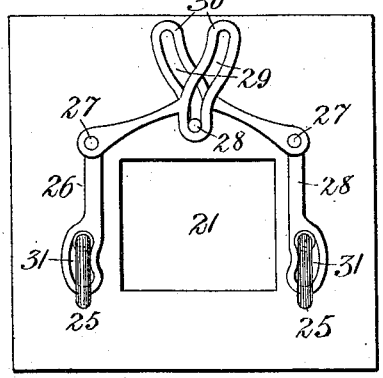
Figure 5:
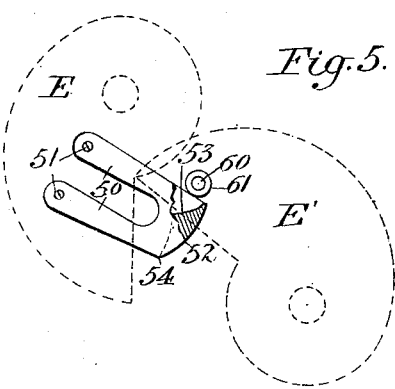
Figure 6:
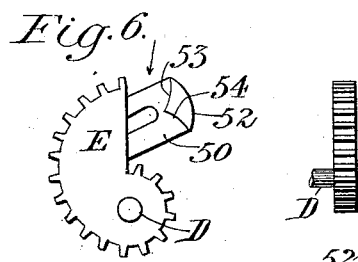
Figure 7:
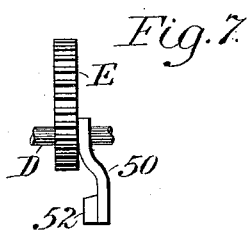

In the accompanying drawings, Figure 1 shows a side elevation, with parts broken away, of a baling-press embodying my invention. Fig. 2 is a top view thereof. Fig. 3 shows a detached detail of the compressing mechanism. Fig. 4 shows a detached bottom view of the condenser-arm, while Fig. 5 shows a detail view of the mechanical movement embodied in my invention. Fig. 6 shows a detached top view of one of the scroll-gear, while Fig. 7 shows an edge view thereof.

My invention comprises, essentially, a horizontally-reciprocating plunger-head B, which is mounted upon and reciprocates within an ordinary supporting-frame A. This plunger-head is of any suitable size and material and is provided with a plunger-bar C, which is preferably movably secured to this plunger-head. At a suitable point at one end I provide the frame A with the transversely-extending shaft D, which shaft is mounted within suitable bearings secured to the frame A, which frame may be timber or metal, as desired. Secured to this shaft D is a scroll-gear E, which gear E is adapted to mesh with a second scroll-gear E', mounted upon a suitable crank-shaft e, which crank-shaft is secured to a support of the frame A. The lower scroll-gear E' is further provided with a pin H, supporting a suitable antifriction-roll 2, as shown in Figs. 1 and 2.

Projecting from the crank-shaft e and practically forming a continuation thereof is an ordinary crank K, to which is secured the plunger-bar C by means of the movable head 3. This frame A is further provided above with an approximately triangular-shaped auxiliary frame 5, which frame 5 is provided with two sets of bearings, one being adapted to contain the shaft 6, which shaft movably holds and supports the feeder-bar F. This feeder-bar has its upper end bifurcated, so as to accommodate the movable feeder 7, which is shown in Fig. 1, and below is provided with an outwardly-curved portion 8, which curved portion terminates in the curved end 9. These curved portions 8 and 9 are provided with the central slot 10, something in the form of a very flattened V, the stems of which are slightly curved. The plunger-bar C is provided with a projecting pin 12, which may be provided with antifriction-rolls, which pin is guided within the slot 10, as illustrated. The auxiliary frame 5 further gives support to a second shaft 13, having an outwardly-extending arm 14, to which a bar 15 is movably connected. This bar 15 at its upper end is movably secured to the feeder 7, as is clearly shown. H represents the main driving-shaft, transversely mounted within the main supporting-frame A, provided with a gear 16, meshing with the gear 17, mounted upon the shaft D. A main driving-pulley 18 is adapted to receive the power.

Mounted upon the frame A is a horizontal platform 20, having a central feed-opening 21. At one side this feed-opening is provided with an upwardly-extending frame 22 in the form of an upwardly-extending sill, which is provided with two terminal shafts 23 23. To these shafts are hinged the two similar wings a, which wings a are provided with fingers x, which interlock in front by means of the terminal bars x'. The sill portion 22 is provided with the two outwardly-extending curved top and bottom horn-shaped projections 24, which coincide with the wings a when said wings are in an open position. By means of these horns 24 and the wings a the material to be fed into the baler is kept from sifting out and over the baler at that end. Each one of the shafts 23 is further provided with a lower curved stem 25, to which a slotted lever 26 is secured, which levers are used in pairs and are pivoted at a suitable point to the frame A by means of the pins 27, as is more clearly shown in Fig. 4. The plunger B is provided with an upwardly-extending pin 28, which pin is adapted to work and reciprocate within the slots 29 29 of the curved arms 30, which arms 30 form the termination of the levers 26, which are provided, further, with a curved slot 31, adapted to contain an upwardly-extending pin 34, forming part of the lower curved arms 25, as is shown in Figs. 1 and 4. In Fig. 3 I have shown the condenser in a closed position, while in Fig. 2 the condenser is shown in an open position.

When all the instrumentalities have been properly arranged and constructed, the operation of my device would be as follows: The motive power would be applied to the driving-shaft D by any suitable means, and from this shaft by means of the scroll-gear E it would be transmitted to the driving scroll-gear E'. This driving-gear E' is mounted loosely upon the shaft e, which shaft e is, as has been stated, prolonged and furnished with a crank K. This crank is anchored to the plunger-bar C, operating the plunger-head, which may be of any suitable size and construction. Above, as has been stated, this plunger-head is provided with an upwardly-extending pin 28, which reciprocates within the slotted arms 30 of the levers 26, which levers are further connected, by means of their slotted ends 31, to the curved bars 25, as is shown in Fig. 4. Pivotally mounted to the main supporting-frame is the curved feeder-bar F, which is actuated by means of a plunger-bar C, the pin 12 of which passes through and reciprocates within the slot 10 of this bar. The bar F in turn movably supports the feeder 7, which is connected by means of the bar 15 to an arm 14, secured to a shaft 13. As this feeder-bar F is reciprocated in being carried forward and backward by means of the plunger-bar C, the feeder is carried downward, but, by means of the connected bar 15 and arm 14, is continuously carried in a straight line, thus continually directing it and keeping it in a central position through the feed-opening, through which this feeder forces the hay in being baled. The baler is supposed to be placed convenient to the material to be baled and the hay is thrown upon the platform and within the condenser. As the scroll-gears revolve the main driving-scroll E' engages the arms of the crank K, and so carries this crank in a circular path with it. As the plunger is reciprocated it carries the feeder-bar in the path of an arc by virtue of the pin 12, working through the slot 10 of the same. As the plunger-head is carried forward it carries the pin 28 with it, and this pin slides within the arms 30 of the lever 26. The wings a are brought into a closed position, as is shown in a top view in Fig. 3, thus compressing the hay within this condensing-chamber. At this instant the feeder is timed to descend and force the hay into this opening, where it is promptly engaged by the plunger, which compresses it and carries it forward. The operation is of course repeated.

In Fig. 5 I have shown a mechanical movement which prevents the scroll-gears E E' from becoming disengaged. It happens occasionally that in coming together these scroll-gears do not register and mesh promptly, thus causing a jarring movement and also running the risk of destroying the same. To prevent this, I provide the main driving-scroll E, which is shown in dotted lines in Fig. 5, with an outwardly-extending metallic frame 50, which frame is secured by means of the bolts 51 to this scroll-gear E. At the forward end this frame is provided with a curved shoe 52, which shoe has two curved surfaces 53 and 54, the one marked 54 being shown in dotted lines. The scroll-gear E' is provided with a pin 60, provided with an ordinary antifriction-roll which is adapted to engage these curved surfaces 53 and 54. This pin is so placed, as is also the frame 50, that the curved surface 53 engages this pin 60 before the gears have become disengaged by means of their change of diameter. During the moment at which these scrolls change their speed they are securely united by means of this pin, or, rather, by the antifriction-rolls 61, which is sliding over the curved surface 53, which surface is of course pitched in the proper and true radius with the path of this arm at that time and instant. At the time that the new pitch and speed is accomplished the antifriction-roll has engaged the second surface 54, which is again true to time and pitch, so that these gears are securely held together during this change and shortly before and after the roller 61 passes underneath the frame 50 and passes against the curved surfaces 53 and 54 of the shoe 52.

In Figs. 6 and 7 I have shown, respectively, a detached front and edge view of the scroll-gear E as detached, more clearly illustrating the position of the curved shoe 52 as held by the arm 50.

Now, having thus described my said invention, what I claim as new, and desire to secure by United States Letters Patent, is—

1. In a baling-press, the combination, with a suitable supporting-frame, of a reciprocating plunger, a feeder-bar pivotally secured to said supporting-frame provided with an end having a slot therein, a pin secured to said plunger-bar and working within said slot, an auxiliary shaft connected to said main supporting-frame and provided with an outwardly-extending arm, a feeder pivotally secured within the end of said feeder-bar and a connecting-rod securing said feeder to the arm of said auxiliary shaft, all substantially as and for the purpose set forth.

2. In a baling-press, the combination, with a suitable supporting-frame, of a reciprocating plunger, a condenser mounted above said plunger and provided with two pivoted movable wings, said wings being provided with outwardly-extending interlocking fingers, said wings further being secured to the plunger and being actuated by the same to open and close, all substantially as and for the purpose set forth.

3. In a baling-press the combination with a suitable supporting-frame of a condenser, said condenser comprising two pivoted wings, extensions from said wings, a plunger-head, said wings and plunger-head being movably connected so that as the plunger-head reciprocates the pivoted wings are actuated, substantially as and for the purpose set forth.

4. In a baling-press, the combination, with a supporting-standard, A, of the reciprocating plunger-bar, C, provided with the plunger-head, B, a condenser comprising the stationary portion, 22, and the movable wing portions, a, a, provided with the interlocking fingers, x, the shaft, 23, provided with the curved ends, 25, securing said movable wings to the stationary portion, the pivoted levers, 26, being provided with the terminal slots, 29, and 31, said slots 29, being adapted to engage a projecting pin, 28, forming part of the plunger-head, and said slots, 31, adapted to engage the curved ends, 25, of the shaft, 23, all arranged substantially as and for the purpose set forth.

5. In a mechanical movement, the combination, with two mating scroll-gears, a pin upon one of said gears, of a projecting arm provided with a shoe having two curved faces, said faces being adapted to engage said pin upon the mating scroll-gear, so that said scroll-gears are securely and snugly locked while making the change in speed, all substantially as and for the purpose set forth.

6. In a baling-press, the combination, with a suitable supporting-frame of a condenser comprising an upwardly-extending sill, having two pivoted wings secured to said sill, said wings having downwardly-extending arms, said wings being provided with interlocking fingers, of two slotted arms pivotally secured to the frame and having one end thereof secured to said arms, and a pin secured within the plunger-head and working within said arms to actuate said fingers, all substantially as and for the purpose set forth.

7. In a baling-press, the combination, with a main supporting-frame, of a condenser comprising an upwardly-extending sill, 22, provided with the terminal shafts, 23, the hinged wings, a, the rack-fingers, x, secured to each of said shafts, 23, being provided with the curved lower stem 25, the slotted levers, 26, working in conjunction with said curved stems, 25, said levers being pivotally secured to the main supporting-frame, a reciprocating plunger-head provided with an upwardly-extending pin adapted to reciprocate within the slotted openings, 29, of the arms, 30, to actuate said arms, all substantially as and for the purpose set forth.

8. The combination, with two scroll-gears, of a mechanical means to catch and guide the teeth of said scroll-gears into proper contact at the moment of the change of speed, all substantially as and for the purpose set forth.

In testimony whereof I affix my signature in presence of two witnesses.

MOSES C. NIXON.

Witnesses:
C. B. BOSTWICK,
ISSIE FRANCE.